US007506356B2

(12) United States Patent
Gupta et al.

(10) Patent No.: US 7,506,356 B2
(45) Date of Patent: *Mar. 17, 2009

(54) SKIMMING CONTINUOUS MULTIMEDIA CONTENT

(75) Inventors: Anoop Gupta, Woodinville, WA (US); Li-Wei He, Bellevue, WA (US); Francis C. Li, El Cerrito, CA (US); Yong Rui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/970,937

(22) Filed: Oct. 22, 2004

(65) Prior Publication Data
US 2005/0086703 A1    Apr. 21, 2005

Related U.S. Application Data

(62) Division of application No. 09/565,819, filed on May 5, 2000, now Pat. No. 7,293,280.

(60) Provisional application No. 60/142,991, filed on Jul. 8, 1999.

(51) Int. Cl.
H04N 7/173 (2006.01)
H04N 7/16 (2006.01)

(52) U.S. Cl. .................... 725/116; 725/134

(58) Field of Classification Search ......... 725/110, 725/131, 139, 151, 134, 114–117; 386/45; 348/553, 701
See application file for complete search history.

(56) References Cited

U.S. PATENT DOCUMENTS

| 4,931,950 | A | 6/1990 | Isle et al. |
| 5,050,161 | A | 9/1991 | Golestani |
| 5,119,474 | A | 6/1992 | Beitel et al. |
| 5,247,364 | A | 9/1993 | Banker et al. |
| 5,274,758 | A | 12/1993 | Beitel et al. |
| 5,309,562 | A | 5/1994 | Li |
| 5,313,454 | A | 5/1994 | Bustini et al. |
| 5,341,474 | A | 8/1994 | Gelman et al. |
| 5,367,330 | A | 11/1994 | Haave et al. |
| 5,414,455 | A | 5/1995 | Hooper et al. |
| 5,434,848 | A | 7/1995 | Chimento, Jr. et al. |

(Continued)

FOREIGN PATENT DOCUMENTS

EP    0605115 A2    7/1994

(Continued)

OTHER PUBLICATIONS

Kimber, Donald et al., "Speaker Segmentation for Browsing Recorded Audio", ACM Press, 1995, p. 212-213.*

(Continued)

*Primary Examiner*—Hunter B. Lonsberry

(57) ABSTRACT

A program distribution system includes a plurality of set-top boxes that receive broadcast programming and segmentation data from content and information providers. The segmentation information indicates portions of programs that are to be included in skimmed or condensed versions of the received programming, and is produced using manual or automated methods. Automated methods include the use of ancillary production data to detect the most important parts of a program. A user interface allows a user to control time scale modification and skimming during playback, and also allows the user to easily browse to different points within the current program.

13 Claims, 4 Drawing Sheets

U.S. PATENT DOCUMENTS

| | | | |
|---|---|---|---|
| 5,455,910 A | 10/1995 | Johnson et al. | |
| 5,481,542 A | 1/1996 | Logston et al. | |
| 5,490,252 A | 2/1996 | Macera et al. | |
| 5,504,744 A | 4/1996 | Adams et al. | |
| 5,519,701 A | 5/1996 | Colmant et al. | |
| 5,521,630 A | 5/1996 | Chen et al. | |
| 5,533,021 A | 7/1996 | Branstad et al. | |
| 5,537,408 A | 7/1996 | Branstad et al. | |
| 5,541,955 A | 7/1996 | Jacobsmeyer | |
| 5,559,942 A | 9/1996 | Gough et al. | |
| 5,566,175 A | 10/1996 | Davis | |
| 5,572,651 A | 11/1996 | Weber et al. | |
| 5,574,724 A | 11/1996 | Bales et al. | |
| 5,592,608 A | 1/1997 | Weber et al. | |
| 5,596,705 A * | 1/1997 | Reimer et al. | 715/720 |
| 5,606,359 A | 2/1997 | Youden et al. | |
| 5,614,940 A | 3/1997 | Cobbley et al. | |
| 5,617,423 A | 4/1997 | Li et al. | |
| 5,623,690 A | 4/1997 | Palmer et al. | |
| 5,625,405 A | 4/1997 | DuLac et al. | |
| 5,640,320 A | 6/1997 | Jackson et al. | |
| 5,664,227 A | 9/1997 | Mauldin et al. | |
| 5,692,213 A | 11/1997 | Goldberg et al. | |
| 5,717,691 A | 2/1998 | Dighe et al. | |
| 5,717,869 A | 2/1998 | Moran et al. | |
| 5,719,786 A | 2/1998 | Nelson et al. | |
| 5,721,829 A | 2/1998 | Dunn et al. | |
| 5,742,347 A | 4/1998 | Kandlur et al. | |
| 5,751,280 A | 5/1998 | Abbott et al. | |
| 5,768,533 A | 6/1998 | Ran | |
| 5,786,814 A | 7/1998 | Moran et al. | |
| 5,794,210 A | 8/1998 | Goldhaber et al. | |
| 5,794,249 A | 8/1998 | Orsolini et al. | |
| 5,799,292 A | 8/1998 | Hekmatpour | |
| 5,801,685 A | 9/1998 | Miller et al. | |
| 5,808,662 A | 9/1998 | Kinney et al. | |
| 5,818,439 A | 10/1998 | Nagasaka et al. | |
| 5,818,510 A * | 10/1998 | Cobbley et al. | 725/139 |
| 5,822,537 A | 10/1998 | Katseff et al. | |
| 5,828,370 A | 10/1998 | Moeller et al. | |
| 5,828,848 A | 10/1998 | MacCormack et al. | |
| 5,835,495 A | 11/1998 | Ferriere | |
| 5,835,667 A | 11/1998 | Wactlar et al. | |
| 5,838,906 A | 11/1998 | Doyle et al. | |
| 5,859,641 A | 1/1999 | Cave | |
| 5,864,682 A | 1/1999 | Porter et al. | |
| 5,870,755 A | 2/1999 | Stevens et al. | |
| 5,873,735 A | 2/1999 | Yamada et al. | |
| 5,874,986 A | 2/1999 | Gibbon et al. | |
| 5,884,056 A | 3/1999 | Steele | |
| 5,892,506 A | 4/1999 | Hermanson | |
| 5,903,673 A | 5/1999 | Wang et al. | |
| 5,918,002 A | 6/1999 | Klemets et al. | |
| 5,930,787 A | 7/1999 | Minakuchi et al. | |
| 5,953,506 A | 9/1999 | Kalra et al. | |
| 5,956,026 A | 9/1999 | Ratakonda | |
| 5,956,716 A | 9/1999 | Kenner et al. | |
| 5,995,095 A | 11/1999 | Ratakonda | |
| 5,995,941 A | 11/1999 | Maquire et al. | |
| 5,999,979 A | 12/1999 | Vellanki et al. | |
| 6,006,241 A | 12/1999 | Purnaveja et al. | |
| 6,014,706 A | 1/2000 | Cannon et al. | |
| 6,023,731 A | 2/2000 | Chawla | |
| 6,029,195 A | 2/2000 | Herz | |
| 6,032,130 A | 2/2000 | Alloul et al. | |
| 6,035,341 A | 3/2000 | Nunally et al. | |
| 6,041,345 A | 3/2000 | Levi et al. | |
| 6,047,327 A | 4/2000 | Tso et al. | |
| 6,049,823 A | 4/2000 | Hwang et al. | |
| 6,061,056 A | 5/2000 | Menard et al. | |
| 6,064,794 A | 5/2000 | McLaren et al. | |
| 6,118,450 A | 9/2000 | Proehl et al. | |
| 6,118,817 A | 9/2000 | Wang | |
| 6,128,653 A | 10/2000 | del Val et al. | |
| 6,133,920 A | 10/2000 | deCarmo et al. | |
| 6,144,375 A | 11/2000 | Jain et al. | |
| 6,148,304 A | 11/2000 | de Vries et al. | |
| 6,154,771 A | 11/2000 | Rangan et al. | |
| 6,166,314 A | 12/2000 | Weinstock et al. | |
| 6,173,317 B1 | 1/2001 | Chaddha et al. | |
| 6,181,342 B1 | 1/2001 | Niblack | |
| 6,185,527 B1 | 2/2001 | Petkovic et al. | |
| 6,188,398 B1 | 2/2001 | Collins-Rector et al. | |
| 6,195,654 B1 | 2/2001 | Wachtel | |
| 6,199,076 B1 | 3/2001 | Logan et al. | |
| 6,204,840 B1 | 3/2001 | Petelycky | |
| 6,215,910 B1 | 4/2001 | Chaddha | |
| 6,230,172 B1 | 5/2001 | Purnaveja et al. | |
| 6,230,205 B1 | 5/2001 | Garrity et al. | |
| 6,233,389 B1 | 5/2001 | Barton et al. | |
| 6,236,395 B1 | 5/2001 | Sezan et al. | |
| 6,263,507 B1 | 7/2001 | Ahmad et al. | |
| 6,295,092 B1 | 9/2001 | Hullinger et al. | |
| 6,317,710 B1 | 11/2001 | Huang et al. | |
| 6,353,461 B1 | 3/2002 | Shore et al. | |
| 6,366,296 B1 | 4/2002 | Boreczky et al. | |
| 6,366,956 B1 | 4/2002 | Krishnan | |
| 6,369,835 B1 | 4/2002 | Lin | |
| 6,385,619 B1 | 5/2002 | Eichstaedt et al. | |
| 6,400,378 B1 | 6/2002 | Snook | |
| 6,446,130 B1 | 9/2002 | Grapes et al. | |
| 6,535,639 B1 | 3/2003 | Uchihachi et al. | |
| 6,567,980 B1 | 5/2003 | Jain et al. | |
| 6,581,207 B1 | 6/2003 | Sumita et al. | |
| 6,584,463 B2 | 6/2003 | Morita et al. | |
| 6,622,171 B2 | 9/2003 | Gupta et al. | |
| 6,711,741 B2 | 3/2004 | Yeo | |
| 6,757,482 B1 * | 6/2004 | Ochiai et al. | 386/83 |
| 6,802,041 B1 | 10/2004 | Rehm | |
| 6,868,440 B1 | 3/2005 | Gupta et al. | |
| 7,293,280 B1 | 11/2007 | Gupta et al. | |
| 7,313,808 B1 | 12/2007 | Gupta et al. | |
| 2003/0030634 A1 | 2/2003 | Sang'udi et al. | |
| 2003/0197710 A1 | 10/2003 | Gonsalves et al. | |

FOREIGN PATENT DOCUMENTS

| | | |
|---|---|---|
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 12/1997 |
| WO | WO 94/01964 | 1/1994 |
| WO | WO 98/37698 | 8/1998 |

OTHER PUBLICATIONS

Hampapur, Arun, "Semantic video indexing: approach and issues", ACM Press, vol. 28, Issue 1 (Mar. 1999), p. 32-39.*

Lienhart, Rainer et al, "Video abstracting", vol. 40, Issue 12 (Dec. 1997), p. 54-62.*

H.J. Chen et al., "A Scalable Video-on-Demand Service for the Provision of VCR-Like Functions," IEEE, May 15, 1995, pp. 65-72.

Lynda Hardman et al., "Multimedia authoring paradigms," *Authoring and Application of Hypermedia-Based User-Interfaces*, IEE Colloquium, The Institution of Electrical Engineers 1995, pp. 8/1-8/3.

John David N. Dionisio and Alfonso F. Cardenas, "A Unified Data Model for Representing Multimedia, Timeline, and Simulation Data," *IEEE Transactions on Knowledge and Data Engineering*, vol. 10, No. 5, Sep./Oct. 1998 pp. 746-767.

Arons, Barry, "SpeechSkimmer: A System for Interactively Skimming Recorded Speech", ACM Transactions on Computer- Human, vol. 4, No. 1, pp. 3-38.

Internet Reference "An Annotated Bibliography of Interactive Speech User Interfaces by Barry Arons" HTTP://barons.www.media.mit.edu/people/barons/AronsAnnotatedBibliography.html, Date unknown.

"GSM Full Rate Speech Transcoding," ETSI/PT 12, Feb. 1992, pp. 1-93.

Informedia—Internet References, http://www.informedia.cs.cmu.edu, date unknown.

Microsoft Corporation and RealNetworks, Inc., "Advanced Streaming Format (ASF) Specification", Feb. 26, 1998, Public Specification Version 1.0, 55 pages.

"Speech Codec for the European Mobile Radio System," P. Vary et al., 1988, pp. 227-230.

Smith, Michael A and Kanade, Takeo, "Video Skimming and Characterization through the Combination of Image and Language Understanding Techniques", 1997, IEEE 1063-6919/97, pp. 775-781.

* cited by examiner

SKIMMING CONTINUOUS MULTIMEDIA CONTENT

RELATED APPLICATION

This application is a divisional application of U.S. patent application Ser. No. 09/565,819, filed May 5, 2000, entitled "Skimming Continuous Multimedia Content", which is hereby incorporated by reference herein. U.S. patent application Ser. No. 09/565,819 stems from and claims priority to U.S. Provisional Application Ser. No. 60/142,991, filed on Jul. 8, 1999, the disclosure of which is incorporated by reference herein.

TECHNICAL FIELD

The following disclosure relates to the recording and subsequent playback of continuous multimedia content such as audio/video content, and to methods of shortening or summarizing such content for playback.

BACKGROUND

VCRs (video cassette recorders) have found nearly universal acceptance as a way to record and distribute audio/visual entertainment content such as motion pictures. These devices use a magnetic tape medium to store audio and video content. VCRs allow recording of several hours of audio/video content, which can then be played back as desired.

One disadvantage of VCRs and their associated tapes is the difficulty of indexing to an intermediate point in the taped content. Because of the linear nature of magnetic tape, it must be manually advanced to the point containing the desired content. Advancing the tape in this manner can take several minutes.

Another limitation of the linear tape format is that only one portion of the tape can be played or recorded at any given instant—it is not possible to record on one portion of the tape while playing back another portion.

These limitations have been addressed in newly emerging devices by storing digitized audio/video content on conventional hard disks. This has been made possible by the continually decreasing cost of hard disk storage. With a hard disk, it is possible to simultaneously record received audio/video on one portion of the disk, while also playing back audio/video from another portion of the disk.

Hard disk recording of broadcast television signals has enabled several features. One of the simplest features enabled by this technology is the ability to "pause" a broadcast television show and then "resume" it without missing any of the content. When the viewer initiates a pause, the viewing device begins recording the show to disk. When the viewing device receives a subsequent resume command, the recorded content is played back to the viewer, while the device continues to record remaining portions of the show. Thus, although the broadcast transmission has continued normally, the user perceives the ability to control the transmission just as if he or she had been watching the show from a recorded VCR tape.

Another feature is the ability for a viewing device or so-called "set-top box" to learn viewing habits and to automatically record favorite shows. The user can then select shows for viewing from an electronic program guide, and watch those shows from hard disk even if the shows have already concluded. This method of interacting with a recording device is much more convenient than present methods of programming VCRs.

These features and others enabled by disk recording technology promise to revolutionize the way broadcast content is distributed and consumed. However, these features also threaten to overwhelm viewers with viewing choices. The technology described below provides ways for a viewer to "skim" through recorded content, providing a new way to deal with the overwhelming volume of broadcast content that is becoming available.

SUMMARY

A content distribution and playback system includes a set-top box or other similar device that receives and records broadcast programming from a plurality of sources. In addition, the set-top box receives segmentation data corresponding to the recorded programming. The segmentation data is used for skimming and indexing through recorded programming.

The system allows a viewer, upon playback, to select both time scale modification and skimming levels. Any selected time scale modification is performed at the set-top box using known time scale modification techniques. Skimming is performed using segmentation data corresponding to the program being played. The segmentation data indicates the most "important" portions of the program—those portions that should be included in a "condensed" or "summarized" version of the program. The set-top box uses this data to select appropriate portions for playback when the user requests skimming.

A user interface is provided that allows control of both time scale modification and skimming. In addition, the user interface allows convenient and intuitive indexing or browsing between different points of programs or shows.

The user interface allows a user to specify concurrent skimming and time-scale modification. Controls are also provided for indexing through a program by various different intervals. A table of contents and displayed still frames provide other ways to index within a program. The user is also able to enter annotations and associate such annotations with specified portions of the program.

DRAWINGS

DETAILED DESCRIPTION

General Architecture

Figure 1:
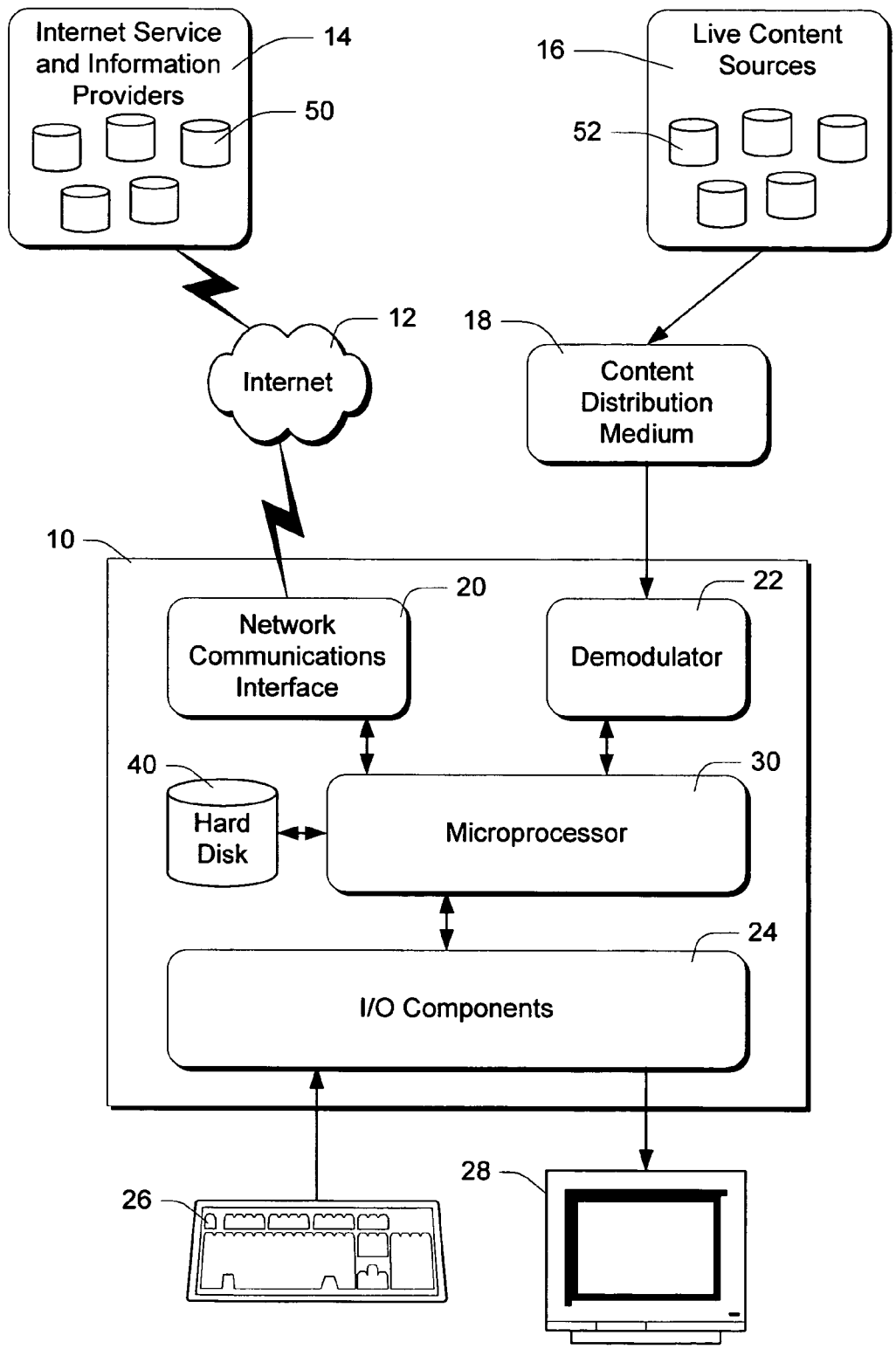
FIG. 1 is a block diagram of a content distribution and playback system.

FIG. 1 shows pertinent components of a computer entertainment system in accordance with an embodiment of the invention. In this embodiment, the system includes a recording de vice or "set-top box" 10, which is a computerized component that works in conjunction with a conventional television set. However, the various features of the invention described below can be provided in a variety of different configurations, such as in a traditional desktop computer or incorporated in a television set.

Set-top box 10 is configured to receive data, described in more detail below, from one or more service and information providers. In the described embodiment, this is accomplished through a public information system or network 12 such as the public Internet. Through this network, set-top box 10 can communicate and interact with a plurality of different service and information providers 14. These providers include conventional World Wide Web data servers that supply traditional Internet content, as well as additional information to be described below. The physical connection to the Internet is through traditional means such as a modem connection. Other means of connection are also becoming more widely available, such as ISDN, DSL, and other digital connections. Furthermore, information providers might be accessible through private connection means, such as by direct modem connection to specific information providers.

Set-top box 10 is also configured to receive broadcast live content from one or more live content sources 16. The term "live content" as used herein refers to continuous content such as audio and video that is provided to an end user at a transmission rate that is not easily varied or interrupted by the user once transmission has begun. This is typically the situation with broadcast television, where a program is broadcast from start to finish without interruption: individual viewers are not able to pause, resume, or otherwise alter the relative time at which specific content is delivered. In the case of broadcast television, transmissions are normally initiated at pre-published times. Other systems, often known as "pay-per-view" or "on-demand" systems, might allow transmission to be initiated at a time specified or selected by a user. Once begun, however, a pay-per-view or on-demand movie plays until its conclusion, with no opportunity to pause and resume or to otherwise change the characteristics of the broadcast stream. Thus, these performances are considered "live" for purposes of this disclosure. Note that the term "live content" in this context does not necessarily refer to content (such as audio or video content) that is transmitted as it is recorded.

In this exemplary embodiment, the live content is delivered through a distribution medium 18 which might comprise a traditional terrestrial RF broadcast system, or a cable or satellite distribution system. These media typically provide broadcast streams at times determined by the content providers. Content might also be delivered over a networking medium such as the public Internet.

Note that the connection to public network 12 is typically bi-directional, allowing the rich interactivity that has made the Internet so popular. The connection to content sources 16, on the other hand, is generally uni-directional. Content is broadcast on a time-table set by the content providers. In many cases, individuals are not able to affect the time at which content is broadcast, and cannot request specific content at specific times.

Note also that the two illustrated forms of content distribution may eventually be merged. For example, a cable television distribution medium might be used for traditional broadcast television signals as well as for bidirectional Internet communications. Alternatively, broadcast or broadcast-like content might be provided through the Internet, using technologies such as multicasting.

Set-top box 10 includes a network communications interface 20 to facilitate Internet communications. Set-top box 10 also includes a television demodulator 22 for receiving traditional broadcast television content. Such content might be received in conventional over-the-air formats. In other embodiments, the content might be received in more recently developed digital formats such as MPEG. Appropriate digital decoders are usually needed in embodiments utilizing MPEG data.

Set-top box 10 also includes I/O components 24 that interface to a keyboard 26 and a television set or other display device 28. The display device includes audio components such as speakers (not shown).

Set-top box 10 has programmable processor 30 and associated components (not shown) that implement the functions described below. Processor 30 is logically connected to communicate with the other components of set-top box 10.

Set-top box 10 has non-volatile storage 40 in the form of a conventional rotating magnetic medium, commonly referred to as a hard disk. Other types of computer-readable storage media might also be used, such as recordable optical disks and/or electronic memory such as flash memory. One useful characteristic of these types of storage devices is that multiple content streams can be simultaneously written to and read from different logical storage locations. In addition, such storage devices allow non-linear access to stored data (in contrast to video cassette tapes), so that different recorded shows or programs can be easily indexed and retrieved. This allows nearly instant playback in response to viewer commands. It also allows different portions of a recorded program to be quickly accessed.

Set-top box 10 is programmed to implement recording and playback functions as described above in the "Background" section of this document. For example, the set-top box implements a "pause" function, in which live content is stored on disk during the pause. Upon a resume command, the recorded content is presented from disk, while the set-top box continues to record remaining portions of a show. Other functions include the ability to automatically record various different programs or shows for subsequent playback at a viewer's discretion.

This functionality, and the functionality described below, is implemented using conventional programming practices. Specifically, an operating program is stored on one or more storage media of set-top box 10, such as non-volatile storage 40 or other memory accessible to microprocessor 30. Alternatively, at least portions of the described functionality might be implemented in some embodiments using gate-type logic, such as programmable gate arrays or application-specific integrated circuits.

Time Scale Modification and Skimming

Set-top box 10 is programmed to facilitate various different types of time scale modification and skimming with respect to recorded content. Time scale modification refers to accelerated playback of content, without removing meaningful content. Skimming refers to omitting less important portions of recorded content during playback.

Most simply, time scale modification can be accomplished by simply speeding up the playback of an audio/video stream. However, modern time scale modification techniques allow this to be accomplished while maintaining the audio pitch of the original stream, thereby improving intelligibility of the resulting accelerated stream. This is referred to as "linear" time scale modification, because each portion of the original stream is compressed by the same amount.

Time scale modification can also be accomplished by deleting "blank" portions of a stream, such as portions that contain no sound or that contain no video movement. This technique is referred to as "non-linear" time scale modification, because different portions of the original stream are affected by different factors.

Various methods of linear and non-linear time scale modification allow accelerated playback at a factor of two or more times the original speed, without compromising comprehension.

In general, the term "skimming" is used to describe viewing only highlights of a presentation, and skipping other parts of the presentation. There are various ways of identifying highlights. One way involves a labor-intensive process of manually selecting important content portions during the authorship process, or based upon actual viewing of selected content. More automatic methods include audio analysis—analysis of pauses, signal energy (loudness), pitch changes, etc. Other automated methods of determining such highlight portions will be described below.

In the described embodiment, set-top box 10 is programmed to perform time scale modification in response to viewer instructions. For example, a viewer can request to watch a recorded program at a speedup factor of 1.5. In response, the set-top box retrieves the program from hard disk and dynamically time compresses the program to play it at 1.5 times its original speed.

In addition, the viewer can request one or more types of skimming or one of several different skimming levels or degrees. To implement this feature, segmentation data is retrieved from one or more remote providers. In the exemplary embodiment, segmentation data 50 is maintained at information providers 14 accessible through the Internet. Such information providers might comprise broadcast networks that compile segmentation data for their own programming. The segmentation data corresponds to respective programs or shows 52 provided from content sources 16.

Segmentation data might also be provided more integrally with the content itself. If the content is transmitted as an MPEG stream, for example, the segmentation data is embedded within the MPEG data. Segmentation data can also be transmitted in conjunction with digital television signals. In systems using traditional television broadcasts, segmentation data can be transmitted during vertical blanking intervals or as part of closed-captioning information.

In the described example, the segmentation data identifies those portions of the corresponding broadcast program that should be included in a "skimmed" version of the program. Such portions are identified by beginning time and ending time, relative to the beginning of the broadcast program. Alternatively, in certain digital formats, frame numbers or other similar data are used to indicate beginning and ending frames of desired and/or non-desired portions of the stream. In another alternative, frames themselves contain flags indicating their desirability relative to a "skimmed" presentation.

As a further alternative, the segment data might indicate the applicability of different content portions to different skimming "levels." For example, a high level of skimming would include very few content portions, while a lower level of skimming might include relatively more and/or longer content portions.

Prior to creating a skimmed version of a content stream, set-top box 10 downloads corresponding segmentation data from an information provider. In some cases, segmentation data is provided contemporaneously with its associated content stream. This is especially appropriate in cases where the content-has been pre-recorded by the content provider, thereby allowing the provider to compile the segmentation data prior to content transmission.

In other cases, segmentation data might only be available at some point after broadcasting the content. In this case, the set-top box either obtains the segmentation data when it becomes available or downloads it as needed to meet viewer requests for skimmed playback. In one embodiment, the set-top box contacts an information provider 14 at predetermined times to download any available segmentation data pertaining to shows that have been recorded by the set-top box.

Different options are also possible for storage of the received content. One storage alternative, when segmentation data is provided contemporaneously with the content transmission, is to store only those portions of the received content that are indicated as being included in skimmed versions of the content. This allows a larger number of programs to be stored on a fixed size storage medium. Another alternative is to store the entire received content, and during playback select only those portions indicated by the segmentation data. Yet another alternative is to initially store the entire program, and then delete undesired portions after receiving the segmentation data.

Figure 2:
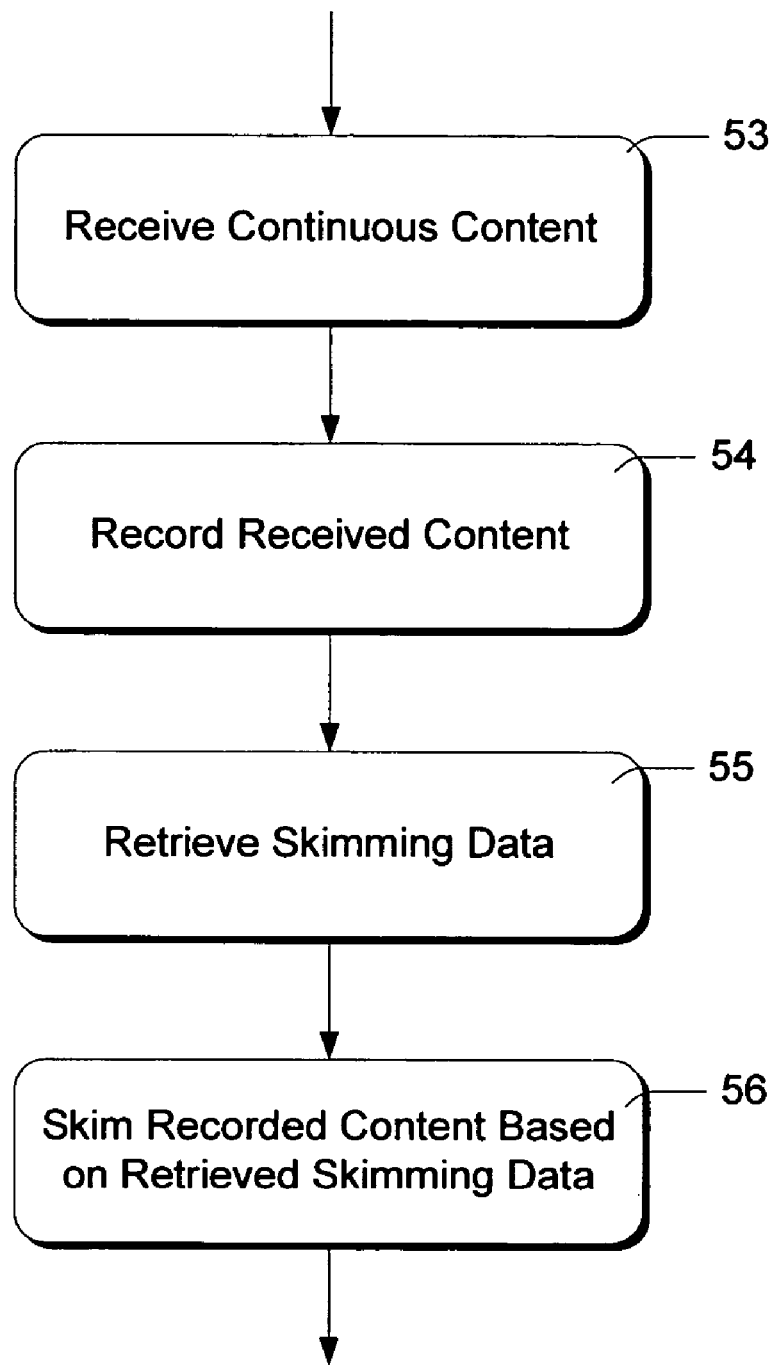
FIG. 2 shows acts performed by a network client relating to content skimming.

FIG. 2 illustrates functions that are performed by set-top box 10. Block 53 illustrates receiving continuous content such as a broadcast television program, audio/video content, or some other type of continuous data or media stream. A function 54 comprises recording the received content on the set-top box's non-linearly accessible storage medium as the content is received. Function 55 comprises retrieving corresponding segmentation data from an Internet source, independently of receiving the continuous content. The segmentation data indicates portions of the received content that are to form part of a skimmed version of the content. This retrieval can be performed either contemporaneously with or after receiving and recording the content itself.

A function 56 comprises playing the portions or segments of the recorded television content indicated by the segmentation data. This is normally performed in response to a user request for a skimmed presentation of the content, in which a user might indicate one of different possible skimming levels.

Figure 3:
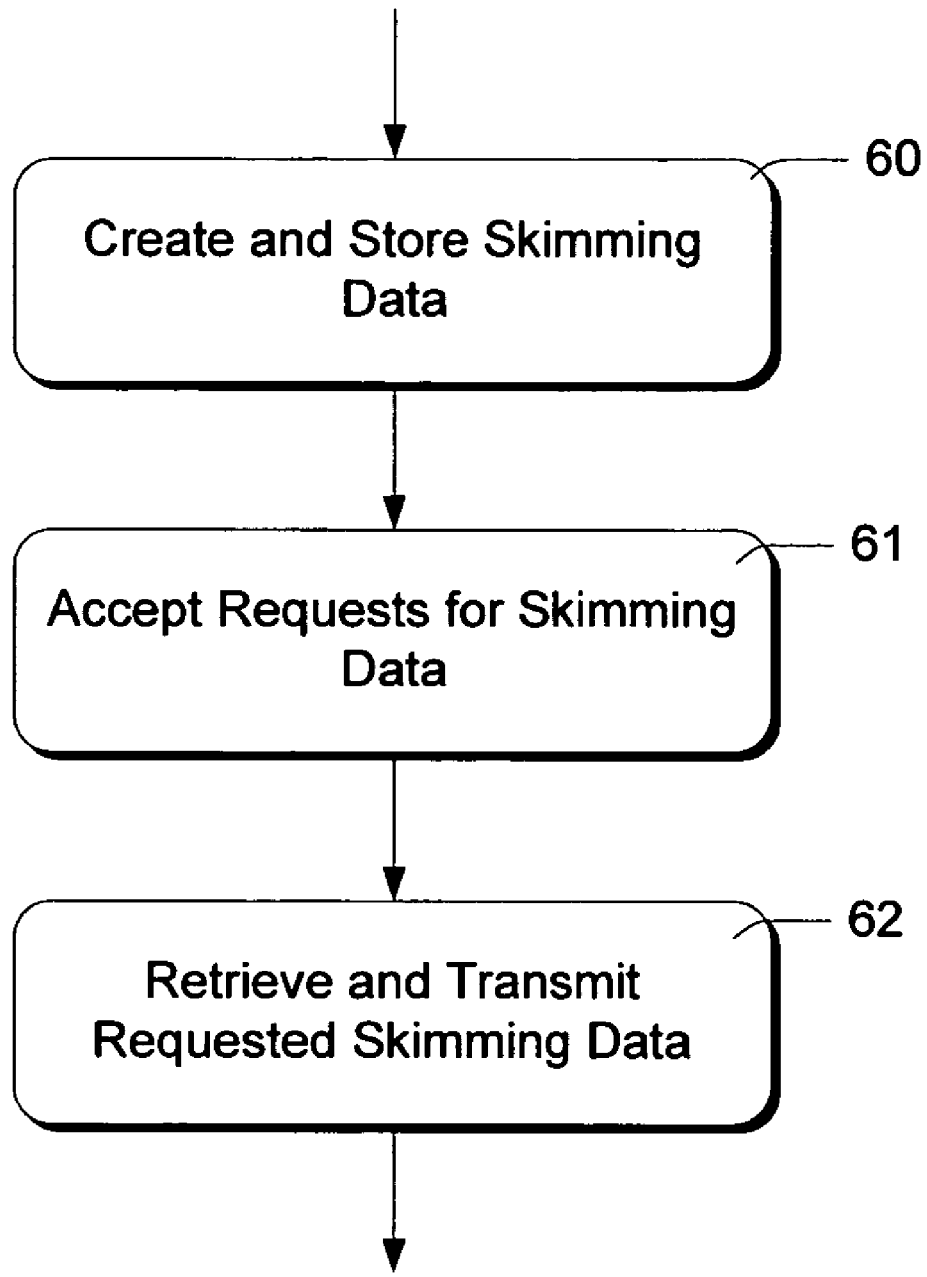
FIG. 3 shows acts performed by a network server relating to providing skimming data.

FIG. 3 illustrates functions performed at or by a server or information provider such as information provider 14. Block 60 illustrates creating segmentation data and storing it on a storage medium accessible to provider 14. Creating the segmentation data comprises identifying portions or segments of continuous content that are to be included during different levels of skimmed content playback. Such portions are identified by relative times or frame numbers. The production of segmentation data is discussed in more detail below.

A function 61 comprises accepting requests from network clients for segmentation data corresponding to identified television programs or other continuous or live content. Function 62 comprises retrieving and transmitting such data in response to the requests.

Producing Segmentation Data

The system described above relies on the availability of segmentation data corresponding to recorded content. Such segmentation data includes skimming data that indicates portions or segments of the content that are to be included in skimmed versions of the content. In addition, segmentation data can indicate other type or categorizations of content. For example, the segmentation data might include categorization data that categorized content according to type or subject: a news program could have categorization data indicating segments corresponding to different topics. Segmentation data might also include indexing data indicating points in the program at which interesting events happen: in a competitive sports broadcast, index data might be used to indicate the points in the program where scoring occurs.

In the system described above, media content such as television programs are distributed to large numbers of viewers, making it economically feasible for broadcast networks and other content providers to compile segmentation data using manual human input. To compile skimming data, employed viewers evaluate the content and produce skimmed versions of the content at different skimming levels. For example, a 30-minute program might be used to produce a 10-minute version and a 20-minute version of the same program. The skimming data comprises lists of segments, in terms of beginning and end points, which are to be played for each version of the program. Similar manual input can be used to generate categorization, indexing, and other types of segmentation data.

In one embodiment, consumers themselves are used in a collaborative manner to generate segmentation data. In this embodiment, each set-top box 10 allows a user to watch a program and to indicate highlight, categorization, and indexing information during viewing. For example, the set-top box might come with a remote control with a dedicated button the viewer can press during interesting portions of the program. The viewers' indications are communicated in real time to a collection center via network connection 12, and are evaluated to produce skimming data for use by later viewers.

Other, automated methods of producing segmentation data are also contemplated. One such method involves analyzing production data or other so-called "ancillary" data to identify highlights, categories, and index points. In the described embodiment, such ancillary data is data other than the primary audio and video data itself. For example, many programs are accompanied by closed captioning which can be analyzed to created segmentation data.

More generally, distributed content normally comprises one or more continuous media streams (such as audio and video streams). Ancillary data is data other than the one or more continuous streams that form the distributed media program.

A variety of production data is often available to program producers and can be effectively analyzed to create segmentation data. For example, "laugh tracks" used in a sitcom can be analyzed to pinpoint the most humorous portions of the show. When using this method, an automated producer of skimming data selects 15 to 30 second portions of the content immediately preceding laugh track activity. Similarly, audience applause can be used to indicate that preceding portions are particularly "interesting" and that those portions should be included in a skimmed version of the program, or should be marked as index points. Background noise can be used in a similar manner. These are examples of audio streams other than the audio stream that forms the actual distributed program itself.

Choice the active camera is another form of production data that can be used to indicate important portions of a program—the first few seconds after switching to a different camera (at a sporting event, for example) might be considered to be especially relevant. Alternatively, it might be determined that the most relevant portions of a program are those portions that utilize multiple camera sources in quick succession.

Data used in creating graphics overlays is another example of production data that might be analyzed to create segmentation data. Such graphics overlays include on-screen scoreboards, tickers, and other textual or graphical information overlaid on camera-generated video. Data used in creating such overlays is readily available during production, or it can be automatically extracted by text segmentation of the images in conjunction with optical character recognition technology.

In some cases, other production data might be used in producing a program. In an instructional program, for example, a lecturer might use computer-generated slides to accompany a presentation. The timing and content of these slides can be analyzed to produce segmentation data. Alternatively, the lecturer can be asked to rate the slides in relative order of importance, and skimming can then be based on this evaluation-a skimmed version would include only the content coinciding with the presentation of relatively important slides. The lecturer could also be asked to categorize and/or index the slides.

Direct automated analysis of primary audio and video content can also be used to locate "important" or "interesting" portions of given content. For example, portions having high degrees of video movement or high audio intensity might be considered more important. Portions following long pauses might be identified as important.

Content Browsing

Figure 4:
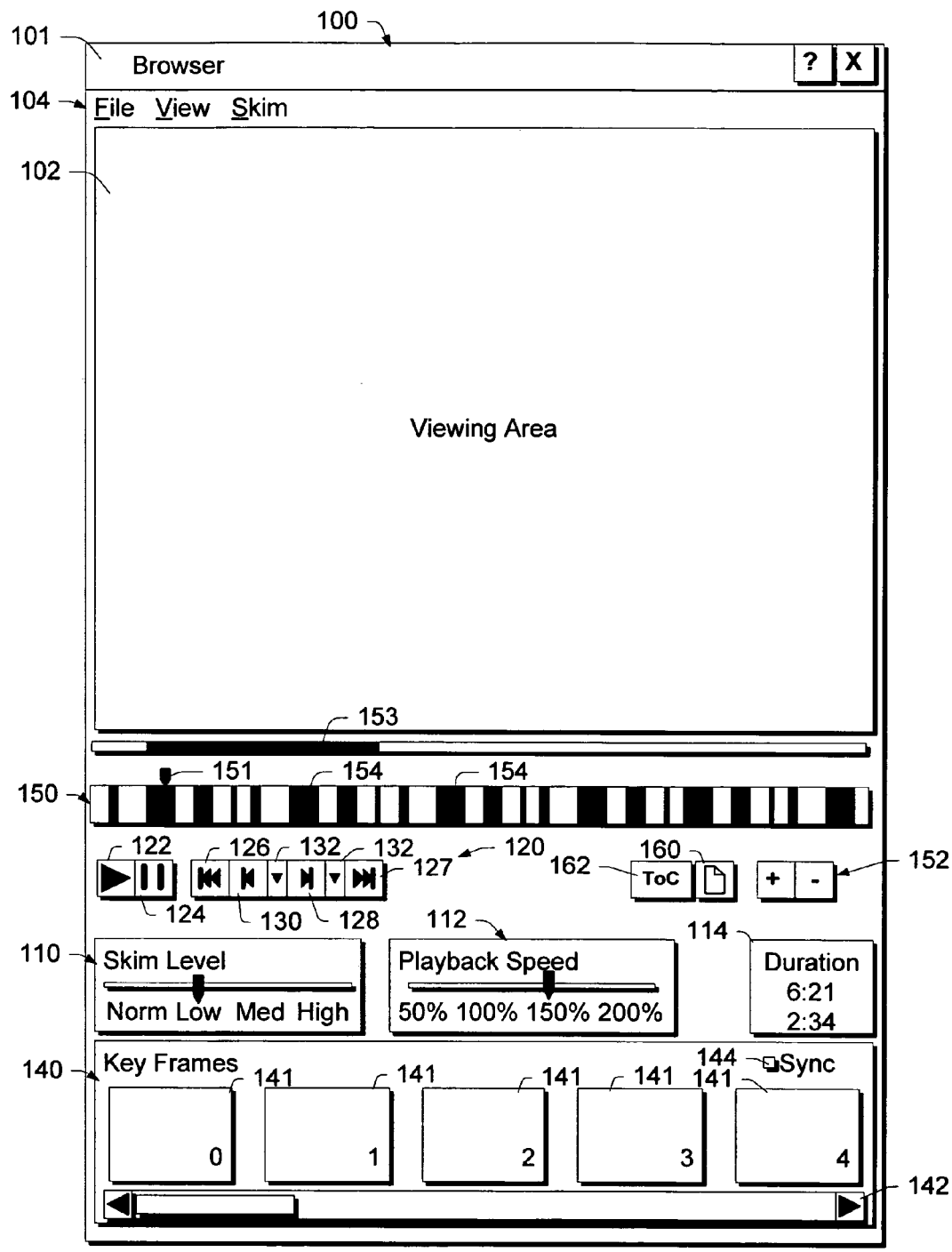
FIG. 4 shows a user interface implemented to control playback of distributed content.

FIG. 4 shows an effective user interface 100, implemented by set-top box 10, for viewing recorded content while utilizing time scale modification and skimming as described above. The interface is presented within a conventional "window" 101 such as is commonly used in the "Windows" operating system environment. This user interface is designed primarily for audio/video playback, but could potentially be adapted for use with other types of continuous and/or streaming content.

User interface 100 includes a viewing area 102 in which video is played. When playing video, its associated audio is also played on speakers associated with the display 28 or associated more generally with set-top box 10.

Window 101 includes a conventional menu bar 104. Within this menu bar, the "File" command is used to select a source of programming and to initiate other related functions such as starting, stopping, or pausing playback. The "View" selection is used to set various attributes of the displayed window. The "Skim" selection is used to select between different types of available skimming, such as those described above.

The user interface includes two slider controls 110 and 112 that allow a viewer to select levels of both skimming and time scale modification. Slider control 110, titled "Skim Level," allows the viewer to select one of four different skimming levels: "normal" indicates no skimming; "low" indicates a low level of skimming; "medium" indicates a medium level of skimming; and "high" indicates the highest level of skimming. By selecting a higher level of skimming, the viewer can produce a shorter version of a given program.

Slider control 112, titled "Playback Speed," allows the user to select different levels of time scale modification to be applied to the currently selected program. The level of time scale modification is expressed as a percentage of the original speed. Accordingly, 100% indicates no time scale modification, while 200% indicates that the program is to be played at twice its original speed. 50% indicates that the program is to be slowed, to half its original speed.

These two slider controls can be used in conjunction with each other to provide effective condensations or summaries of different programs. When both skimming and time scale modification are specified, the specified skimming and time scale modification levels are concurrently applied to the current content. First, the set-top box uses the skimming data discussed above to select different portions of the program to play. Then, these portions are subjected to time scale modification in accordance with the playback speed specified. A "Duration" box 114 shows both the original length of the program and the length of the condensed version, based on the selection made by the user in the slider controls 110 and 112.

The user interface has features to enable effective "browsing" within a program. One such feature is a collection of control buttons 120. These control buttons include a "play" button 122 and a "pause" button 124. The play button is selected to begin playback of a selected program. During playback, the play button changes to a "stop" button, which can be selected to stop playback. The pause button is used to temporarily "freeze" program playback at a particular frame. The program can be resumed by selecting the button a second time.

The control buttons also include indexing buttons that can be selected to move to different points within the current program. These buttons are selected to advance to particular portions of a program. If the program is already playing when these buttons are selected, playback continues at a new point in the program, depending on the nature of the button selected. If the program is not playing or is paused, the program will begin at the selected location when started or resumed.

A "rewind" index button 126 moves to the beginning of the program. A "fast forward" index button 127 moves to the end of the program.

An "incremental forward" 128 index button moves ahead in the program by a defined interval such as 5 seconds. An "incremental rewind" index button 130 moves back by the same interval.

An "increment selection" button 132 is associated with each of incremental forward and rewind buttons 128. Each of increment control buttons 132 generates a pull-down menu from which the user can select different index increments to be used in conjunction with the associated incremental forward or incremental rewind button 130. Each pull-down menu includes time interval selections such as "5 seconds," "10 seconds," "20 seconds," etc. In addition, other increments such as "event" intervals can be presented within this pull-down menu, corresponding to different types of segmentation data. For example, the menu might include a selection for "hits" (in a baseball game broadcast) which would cause the incremental buttons to move between portions of the program containing hits (as indicated by index or categorization data). The menu might include a selection for "next skimming portion," in which case the incremental buttons would move between adjacent "important" portions of the program, as defined by skimming data. In response to activating one of index buttons 126 or 127, the set-top box indexes the displayed program forward or backward by the selected index increment.

Another browsing feature is presented in a "Key Frames" section 140 of window 101. This section shows a linear sequence of significant still frames 141 taken from the current program. These still frames are preferably defined by the segmentation data, and might comprise simply the first frame of each program portion identified in the skimming data. The frames scroll automatically through section 140 as the program progresses, in synchronization with the displayed video. A frame highlight, such as a bright border, indicates the current frame—the frame immediately preceding the content currently being played.

A user can immediately index to a particular portion of the program by selecting one (clicking on) of the frames in section 140. Selecting a frame indexes the currently playing content to the selected frame, and causes that frame to be highlighted. In addition, the pull-down menu associated with increment selection button 132 includes a designation for "key frames," which causes the incremental forward and rewind buttons 128 and 130 to move forward and backward between key frames.

Normally, frames 141 scroll automatically through section 140 of window 101, so that the current, highlighted frame is always within view. A scroll bar 142, immediately below the linear sequence of frames, allows a viewer to manually scroll through the key frames. This does not affect playback, which continues without interruption even though the current, highlighted frame might disappear from view. A "sync" check box 144 allows a user to resynchronize the Key Frames section 140 when this happens—to scroll the current frame back into view. The check box is automatically cleared whenever the user scrolls the currently active frame out section 140. Automatic scrolling is disabled whenever check box 144 is not checked.

Window 101 includes a progress bar 150, containing an indicator 151 that moves across the bar in accordance with the current playback point within the overall program. The indicator is updated continuously. When the user indexes or skims, the indicator moves immediately to indicate the new location within the program. Zoom control buttons 152 adjust the resolution of the progress bar. Selecting the "+" zoom control button causes the progress bar to display a smaller portion of the playing program, at a higher resolution. Selecting the "−" zoom control button has the opposite effect. A progress scroll bar 153, over progress bar 150, indicates the portion of the overall program represented by progress bar 150.

The progress bar is delineated to indicate portions of the currently playing content that are included in the currently specified skimming level. More specifically, shaded bars 154 along the progress bar 150 indicate portions of the program that will be shown in the currently selected skimming level. These bars change depending on the type and level of skimming selected. Alternatively, these bars might show content "categories" in different colors. For example, green bars might be used to indicate program portions containing hits in a baseball game. Red might indicate home runs.

The user interface includes a "notes" button 160, which is selectable to allow a user to type or otherwise enter notes or annotations, to be associated with different points within the playing program. Selecting this button opens a menu listing a directory of annotations that have already been entered, along with times indicating the points in the program with which the annotations correspond. In addition, this menu presents options for the user to open or read a specific annotation, to add a new annotation, to delete an existing annotation, or to move in the program to the point corresponding to a particular existing annotation.

The user interface also includes a "Table of Content" button 162, which opens a directory of titles or subtitles corresponding to defined points in the playing program. These titles and their indicated program times are preferably included in the skimming data discussed above. The directory allows the user to select a particular title, and to then move in the playing program to the point corresponding to that title.

The times corresponding to both annotations and to Table of Contents titles are optionally shown in progress bar 150, in a different color than other indications in the progress bar. In addition, notes and titles are presented as options in the menus opened by increment selection buttons 132.

The functionality of user interface 100 is implemented by the operating program of set-top box 10. The operating program performs the acts of displaying the various components and/or controls described above in a user interface window and of responding to user operation or actuation of the controls to implement the described functionality.

CONCLUSION

The system described above allows the integration of various time scale modification and skimming techniques with the newly emerging generation of program recording devices, in a way that provides significant convenience to viewers.

Specifically, the system allows viewers to more easily deal with the increasing quantity of programming that is becoming available.

Although the system has been described in language specific to structural features and/or methodological aspects, it is to be understood that the invention defined in the appended claims is not necessarily limited to the specific features described above. Rather, the specific features are disclosed as exemplary forms of implementation.

The invention claimed is:

1. A method comprising:
    analyzing non-broadcast production data used in producing a broadcast television program transmitted via a broadcast network to one or more clients, wherein the non-broadcast production data is selected from a group consisting of:
        a laugh track; and
        computer-generated data used in producing the broadcast television program;
    based on said analysis of non-broadcast production data, producing segmentation data identifying portions of the broadcast television program that are to be included during skimmed playback of said broadcast television program; and
    maintaining the segmentation data accessible via a public network, wherein the segmentation data obtained via the public network is utilized by the one or more clients for skimmed playback of the broadcast television program received via the broadcast network.

2. A method as recited in claim 1, wherein the computer-generated data used in producing the broadcast television program comprises active camera data.

3. A method as recited in claim 1, wherein the computer-generated data used in producing the broadcast television program comprises data used in creating graphics overlays for the broadcast television program.

4. One or more computer-readable storage media containing a computer-executable program comprising:
    analyzing non-broadcast production data used in producing a continuous media program, the continuous media program comprising one or more continuous media streams distributed via a broadcast network to one or more clients, wherein said non-broadcast production data is other than the one or more media streams and includes computer-generated data used in producing the broadcast television program; and
    based on said analysis of non-broadcast production data, producing segmentation data identifying time portions of the continuous media program that are to be included during skimmed playback of said continuous media program, wherein the segmentation data produced based upon said analysis of non-broadcast production data includes data associating each said time portion to one or more skimming levels; and
    outputting a user interface having selectable controls to initiate skimmed playback of said continuous media program including selecting a skimming level from among multiple different skimming levels thereby including in the skimmed playback multiple said time portions of the continuous media program that are associated with the selected skimming level based on the segmentation data.

5. One or more computer-readable storage media as recited in claim 4, wherein said analyzing comprises analyzing a laugh track.

6. One or more computer-readable storage media as recited in claim 4, wherein said analyzing comprises analyzing active camera data.

7. One or more computer-readable storage media as recited in claim 4, wherein said analyzing comprises analyzing data used in creating graphics overlays for the broadcast television program.

8. A method comprising:
    analyzing non-broadcast production data used in producing a broadcast television program, wherein the non-broadcast production data comprises computer-generated data used in producing the broadcast television program; and
    based on said analysis of non-broadcast production data, producing segmentation data identifying portions of the broadcast television program that are to be included during skimmed playback of said broadcast television program, wherein the segmentation data produced based upon said analysis of non-broadcast production data includes data associating each said time portion to one or more skimming levels; and
    outputting a user interface having selectable controls to initiate skimmed playback of said continuous media program including selecting a skimming level from among different skimming levels thereby including in the skimmed playback multiple said time portions of the continuous media program that are associated with the selected skimming level based on the segmentation data.

9. A method as recited in claim 8, wherein the computer-generated data used in producing the broadcast television program comprises active camera data.

10. A method as recited in claim 8, wherein the computer-generated data used in producing the broadcast television program comprises data used in creating graphics overlays for the broadcast television program.

11. A method as recited in claim 8, wherein the non-broadcast production data further comprises a laugh track.

12. A method as recited in claim 8, wherein the non-broadcast production data comprises ancillary data other than one or more continuous media streams which form the broadcast television program.

13. A method as recited in claim 1, wherein the non-broadcast production data comprises ancillary data other than one or more continuous media streams which form the broadcast television program.

* * * * *